US007745769B2

(12) United States Patent
Tracy et al.

(10) Patent No.: US 7,745,769 B2
(45) Date of Patent: Jun. 29, 2010

(54) SYSTEM FOR ADJUSTING A LIGHT SOURCE BY SENSING AMBIENT ILLUMINATION

(75) Inventors: Alfred Tracy, Delray Beach, FL (US); Leonard C. Bryan, Palm Beach Gardens, FL (US); Paul L. Culler, Tequesta, FL (US)

(73) Assignee: Ecolivegreen Corp., Parkland, FL (US)

( * ) Notice: Subject to any disclaimer, the term of this patent is extended or adjusted under 35 U.S.C. 154(b) by 0 days.

(21) Appl. No.: 11/940,895

(22) Filed: Nov. 15, 2007

(65) Prior Publication Data

US 2008/0149810 A1 Jun. 26, 2008

Related U.S. Application Data

(60) Provisional application No. 60/859,170, filed on Nov. 15, 2006.

(51) Int. Cl.
*G01J 1/32* (2006.01)
*H05B 37/02* (2006.01)

(52) U.S. Cl. ................................ 250/205; 250/214 AL

(58) Field of Classification Search ................ 250/205, 250/226, 216, 206, 208.1, 214.1, 214 AL, 250/552; 362/293, 231, 276, 234; 315/291, 315/151, 158, 224, 382, 149, 307
See application file for complete search history.

(56) References Cited

U.S. PATENT DOCUMENTS

| | | | | |
|---|---|---|---|---|
| 4,665,470 | A | 5/1987 | George | |
| 4,943,900 | A | 7/1990 | Gartner | |
| 5,032,960 | A | 7/1991 | Katoh | |
| 5,515,253 | A | 5/1996 | Sjobom | |
| 6,127,783 | A | 10/2000 | Pashley | |
| 6,135,620 | A | 10/2000 | Marsh | |
| 6,211,612 | B1 | 4/2001 | Ge | |
| 6,331,915 | B1 | 12/2001 | Myers | |
| 6,441,558 | B1 | 8/2002 | Muthu | |
| 6,445,139 | B1 | 9/2002 | Marshall | |
| 6,495,964 | B1 | 12/2002 | Muthu | |
| 6,529,678 | B2 | 3/2003 | Shie et al. | |
| 6,534,927 | B1 | 3/2003 | Takaoka | |
| 6,534,934 | B1 | 3/2003 | Lin et al. | |
| 6,535,190 | B2 | 3/2003 | Evanicky | |
| 6,583,550 | B2 | 6/2003 | Iwasa et al. | |
| 6,661,545 | B2 * | 12/2003 | Sato et al. | 358/509 |
| 6,860,628 | B2 | 3/2005 | Robertson et al. | |
| 6,869,298 | B2 | 3/2005 | Latsis | |
| 2004/0052076 | A1 * | 3/2004 | Mueller et al. | 362/293 |
| 2004/0105264 | A1 * | 6/2004 | Spero | 362/276 |

* cited by examiner

*Primary Examiner*—Thanh X Luu
*Assistant Examiner*—Jennifer Bennett
(74) *Attorney, Agent, or Firm*—Stone Creek LLC; Alan M. Flum

(57) ABSTRACT

A method and system for adjusting a light source that is capable of displaying light of different colors receives inputs from various sources and provides an output color selection signal. The output color selection signal is applied to the light source to adjust the intensity and color thereof.

10 Claims, 14 Drawing Sheets

SYSTEM FOR ADJUSTING A LIGHT SOURCE BY SENSING AMBIENT ILLUMINATION

TECHNICAL FIELD

This disclosure relates generally to the commercial lighting art. More particularly, this invention relates to lighting systems and circuitry which may be used to replace and/or augment existing fluorescent lighting fixtures and the like, as well as circuits for operating such fixtures.

BACKGROUND

Conventional fluorescent lighting fixtures have been used for many years in drop ceilings and for other applications in industrial, commercial and residential establishments. These fixtures have been used because of energy efficiency and due to their wide distribution of light from a planar source. That is, fluorescent lamps are more efficient than incandescent lamps at producing light at wave lengths that are useful to humans. They operate to produce less heat for the same effective light output as compared to incandescent lamps. Also, the fluorescent bulbs themselves tend to last longer than incandescent lamps.

Conventional fluorescent lighting fixtures utilize a type of gas discharge tube in which a pair of electrodes is disposed at the respective ends of the discharge tube. The electrodes are sealed along with mercury and inert gas, such as argon, at very low pressure within the glass tube. The inside of the tube is coated with a phosphor which produces visible light when excited with ultraviolet radiation. The electrodes are typically formed as filaments that are either preheated or rapidly heated during a starting process in order to decrease the voltage required to ionize the gas within the tube. The electrodes remain hot during normal operation as a result of the gas discharge. Electric current passing through the low pressure gases emits ultraviolet radiation. The gas discharge radiation is converted by the phosphor coating to visible light. That is, such discharge occurs by a bombardment of ultraviolet photons, emitted by the mercury gas, which excite the coating to thereby produce visible light.

When the lamp is off, the mercury gas mixture is non-conductive. Therefore, when power is first applied, a relatively high voltage is needed to initiate the gas discharge. Once the discharge begins to occur, however, a much lower voltage is needed to maintain operation of the light. In this regard, the fluorescent lamp may be viewed as a negative resistance element. For operating the fluorescent lamp in its various stages, a ballast is typically employed. The ballast provides the high voltage necessary to ionize the gas to start the lamp, then to control the voltage and limit the current flow once the lamp begins to conduct current.

One special-purpose type of fluorescent lamp is known as a Cold Cathode Fluorescent Lamp ("CCFL"). While CCFL technology is generally known, its application has been limited to date. Specifically, CCFLs are often used as white-light sources to backlight liquid crystal displays or as decorative elements in interior design. As with conventional fluorescent lamps, CCFLs are sealed glass tubes filled with inert gases. When a high voltage is placed across the tube, the gases ionize to create ultraviolet ("UV") light. The UV light, in turn, excites an inner coating of phosphor, creating visible light.

The gases within the CCFLs are first ionized to create light. Ionization occurs when a voltage, approximately 1.2 to 1.5 times the nominal-rated operating voltage, is placed across the lamp for a few hundreds of microseconds. Before ionization occurs, the impedance across the lamp is highly resistive. Indeed, in a typical application, it may appear to be capacitive. At the onset of ionization, current begins to flow in the lamp, its impedance drops rapidly into the hundreds of K-ohms range, and it appears almost completely resistive.

To minimize lamp stress, the striking waveforms should be symmetrical, linear or sinusoidal voltage ramps without spikes. Because CCFL characteristics vary greatly with temperature, the voltage required to strike a CCFL also varies with temperature, and in many cases, the timing of the lamp strike is not highly repeatable. It may vary ±50%, even under the same temperature and biasing conditions.

Therefore, a need exists for more practical and efficient lighting solutions at reduced power consumption. Also, it would be desirable to provide a lighting solution that provides improved lighting characteristics through varying a color spectra provided by the lighting solution.

SUMMARY

The present disclosure relates to a method and system for adjusting a light source located in an interior space where the light source is of the type that is capable of displaying light of different colors. A microprocessor or other logic circuit receives inputs from various sources. For example, a brightness or illumination sensor senses the ambient illumination of the interior space and provides an illumination signal to the microprocessor. A brightness adjustment input signal is also optionally provided to the microprocessor. In addition, a color balance adjustment input signal is provided to the microprocessor. These and optionally other input signals are processed in order to develop an output color selection signal. The output color selection signal is applied to the light source to alter either the intensity or the color of the light source or both. Thus, for example, when a lamp of a first color and a lamp of a second color are used, the output color selection signal may be employed to adjust the respective first lamp color and the second lamp color to obtain a desired illumination.

DETAILED DESCRIPTION OF PREFERRED EMBODIMENTS

Generally, the present disclosure relates to lighting systems and circuitry which provides an output from a light source capable of displaying light of different colors. By way of example, the disclosure may be used to replace and/or augment existing fluorescent lighting fixtures and circuits for operating such fixtures. In one aspect, the disclosure provides a Cold Cathode Fluorescent Lamp ("CCFL") arrangement and a CCFL lighting fixture that are suitable for replacing conventional "preheat" or "rapid start" fluorescent lamps and lighting fixtures. In another aspect, the disclosure provides an LED array and control circuit for such an array that is suitable for replacement of a conventional fluorescent lighting fixture.

Figure 1:
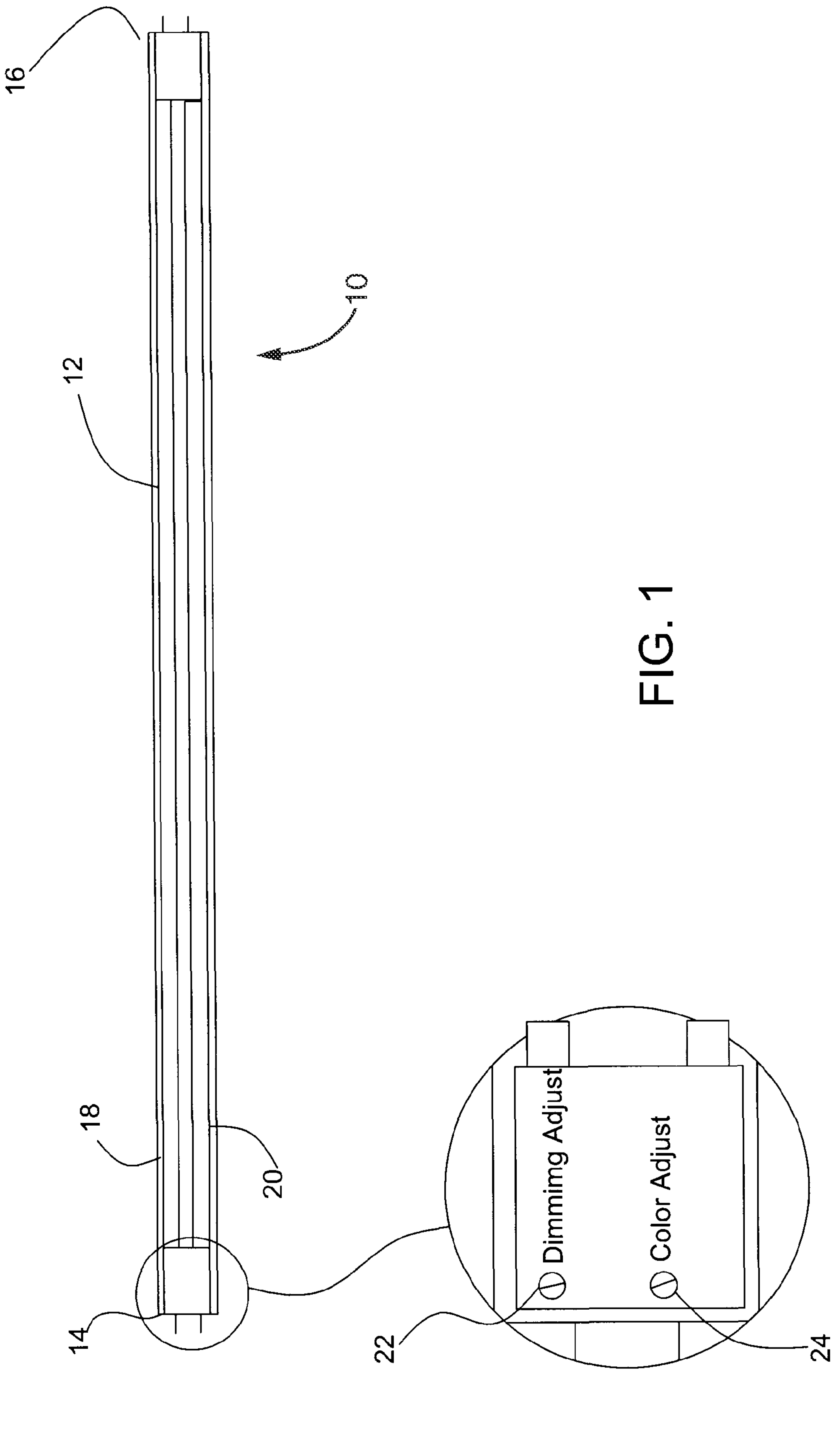
FIG. 1 is a diagram of a Cold Cathode Fluorescent Lamp ("CCFL") arrangement that is suitable for use in a conventional fluorescent lighting fixture according to one aspect of the disclosure.

FIG. 1 is a cross section view of a fluorescent tube assembly 10 according to one embodiment of the present disclosure. The tube assembly 10 includes a generally cylindrical outer tube 12 that houses pairs of electrode control circuit subassemblies 14, 16 disposed at each end of the outer tube 12. A plurality of spaced Cold Cathode Fluorescent Lamp ("CCFL") tubes, such as CCFL tubes 18 and 20 shown in FIG. 1, are located within the outer tube 12. In a preferred embodiment, the tube assembly 10 has two CCFL tubes 18 and 20, arranged in spaced relation to each other. One of the electrode control circuit subassemblies 14 includes a dimming adjustment control 22 and a color adjustment control 24. As explained below, the CCFL tubes preferably emit light in different frequency spectra resulting in the emission of different colors of light according to the intended use of the assembly 10. The intensity and color emitted are controlled by the adjustment controls 22 and 24, respectfully. The opposite control subassembly 16 may be used to complete a circuit path with the fluorescent tubes and the control subassembly 14.

In this regard, the color emitted by the CCFL tubes is chosen and controlled according to an intended color effect. Those skilled in the art will appreciate that the manner in which color affects individuals varies from person to person. Color parameters are often used to define the effect of the color of light projected on a living area, which may include: (1) color value, which is the emotional response an individual may have to a particular color, color spectra or group of colors; and (2) color rendering, which is the ability for accurate colors to be perceived by projected light on an object using midday sunlight as a reference.

Typical existing standard fluorescent bulbs emit light that causes flesh tones to appear ghastly. This has a negative psychological effect on individuals living or working under such light. The reason for this is that the spectrum of light emitted by these fluorescent lamps is not the same as that of the sun or of a candle flame, as in the case of warm incandescent lighting. Current bulbs are sometimes designed to emit more natural sun light spectra, but they are expensive, and not often used. Additionally, one may not vary the color of these bulbs without replacing the bulb entirely.

One objective of the present disclosure is to provide a simple method and arrangement to vary the color emitted by a light source in a range that varies between a maximum wavelength and a minimum wavelength. Such variation may be performed via a manual adjustment or by automated processes. In an embodiment, a determination of the wavelengths of color at the extrema of the adjustment range is also determined. In addition, a preferred embodiment employs two or more colorized bulbs instead of a single bulb that emits a particular color to enable "filling-in" of spectral gaps emitted by each bulb individually. This allows for a more even color spectrum, thus approaching that of natural sunlight or candle light.

Color has been found to have an affect on psychological health and productivity of individuals and other animals. Personality traits that are exhibited as a result of perceived Color Values may vary from sad to happy, confusion to intelligence, and fear to confidence. For example, neutral colors tend to cause relaxing feelings of peace and well being. Red tones generate a warm cozy response. White colors create a mood of purity and innocence. Green-blue hues create sophisticated and witty moods. Cranberry stimulates an intellectual response. Strong primary colors (rather than neutral colors, as described above) create a playful environment. Since Color Rendering may be entirely altered by projected light on an object, the color of light being emitted by a source may also contribute as much as the actual color of the objects in an environment to the perceived color of such objects.

Research indicates that variation in natural light experienced by an individual throughout the day alters the mood of the individual, such as to overcome feelings of boredom and depression. Varying lighting, whether from a natural or artificial source, throughout a room accomplishes the same result. The current disclosure provides variation of light color and intensity throughout the day with the use of automated procedures, thereby further providing variance in color and intensity throughout a room. The present disclosure also provides easy adjustment of light intensity and color to fit within an "Amenity Curve," based upon a pilot study by A. A. Kruithof, 1941. See McCloud, Kevin "Ken McClouds Lighting Style", Simon and Shuster; "Home Color Book", Melaine and John Ayes, Rockport Publishing; "Interior Lighting for Designers", Gary Gordon, John Wiley and Sons; Flynn et al., "A Guide to Methodology Procedures for Measuring Subjective Impressions in Lighting," Journal of IES, 95-110 (January 1979).

To match the light output of standard fluorescent tubes when using very bright phosphors and 2.0 mm CCFL tubes, three CCFL tubes are conventionally placed within the tube assembly 12. This number may vary, and it is currently contemplated that two and five or more CCFL tubes may be utilized, depending upon a specific design and application.

Each of the electrode control circuit subassemblies 14, 16 is used to house a plurality of Standard Hot Cathode Fluorescent tubes, each of which contains heaters across the two electrode control assemblies 14 and 16 shown in FIG. 1. The heaters are controlled by a ballast (not shown) as is known in the art, and operate to shut off when the gas inside the tube is sufficiently hot to ionize. When this occurs, the bulb acts like a short circuit across the length of the tube. The ballast acts as a current limiting device, permitting sufficient electrical power to the short circuit required to maintain ionization of the bulb. The embodiment depicted in FIG. 1 provides a replacement for a standard Hot Cathode Fluorescent tube, thus no structural ballast changes are required. In this regard, the electrode control subassemblies depicted by numerals 14 and 16 illustrate a power supply circuit that performs the function of emulating a ballast, as described in greater detail below.

Figure 1A:
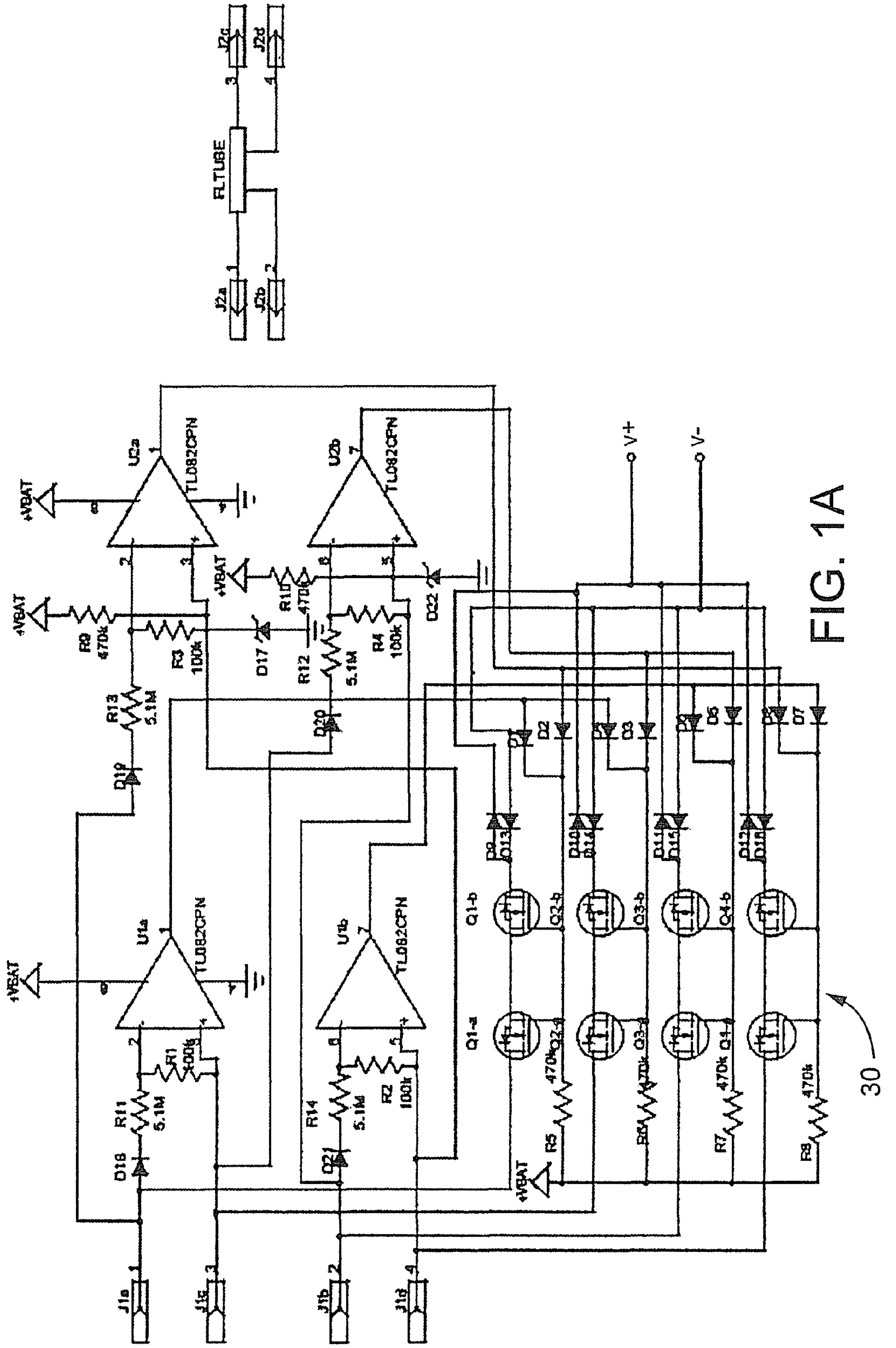
FIG. 1A is a pre-power supply circuit schematic diagram suitable for use in conjunction with the embodiment of FIG. 1.

FIG. 1A is a pre-power supplying circuit diagram that may be utilized with the arrangement shown in FIG. 1. The pre-power supply circuit 30 detects which two of the standard four lines present in a typical fluorescent bulb fixture is receiving power. The four contacts on a fluorescent bulb connect to respective connectors J1 *a-d*. Two pairs of comparator circuits, U1*a, b* and U2 *a, b*, sense a signal developed on the appropriate pair of contacts. The comparators U1*a, b* and U2 *a, b* operate to turn on the appropriate one of a plurality of transistors Q1 through Q4. In a preferred embodiment, the transistors Q1 through Q4 are high voltage N-channel Enhancement MOSFET transistors. The MOSFET transistors Q1 through Q4 are arranged in a back-to-back configuration in pairs. This arrangement overcomes the parasitic diode present in MOSFETS, allowing the transistors to appropriately switch to provide an alternating current output. The output is then rectified by a plurality of diodes D1-D7 and passed to the 5 volt power supply that supplies power to the CCFL driver circuit. In one embodiment, the values and ratings of the components illustrated in FIG. 1A are as shown in Table I below:

TABLE I

| Item | Qty | Description | Reference Designator | Value |
|---|---|---|---|---|
| 1 | 4 | Resistor | R1-R4 | 100K 1/10w; 0402 |
| 2 | 4 | Resistor | R11-14 | 5.1M 1/8w; 0805 |
| 3 | 4 | Diodes | D18-21 | 1N4148 |
| 4 | 2 | Diodes | D17,22 | 1.22 V ref. |
| 5 | 2 | Op amp | V1-V2 | TL082 |
| 6 | 4 | FET | Q1-Q4 | N-MOSFET 300 V |
| 7 | 6 | Resistors | R5-R10 | 470K |
| 8 | 8 | Diodes | D1-D8 | DSS17-06CR |
| 9 | 8 | Diodes | D9-D16 | DSS17-06CR |

Figure 2:
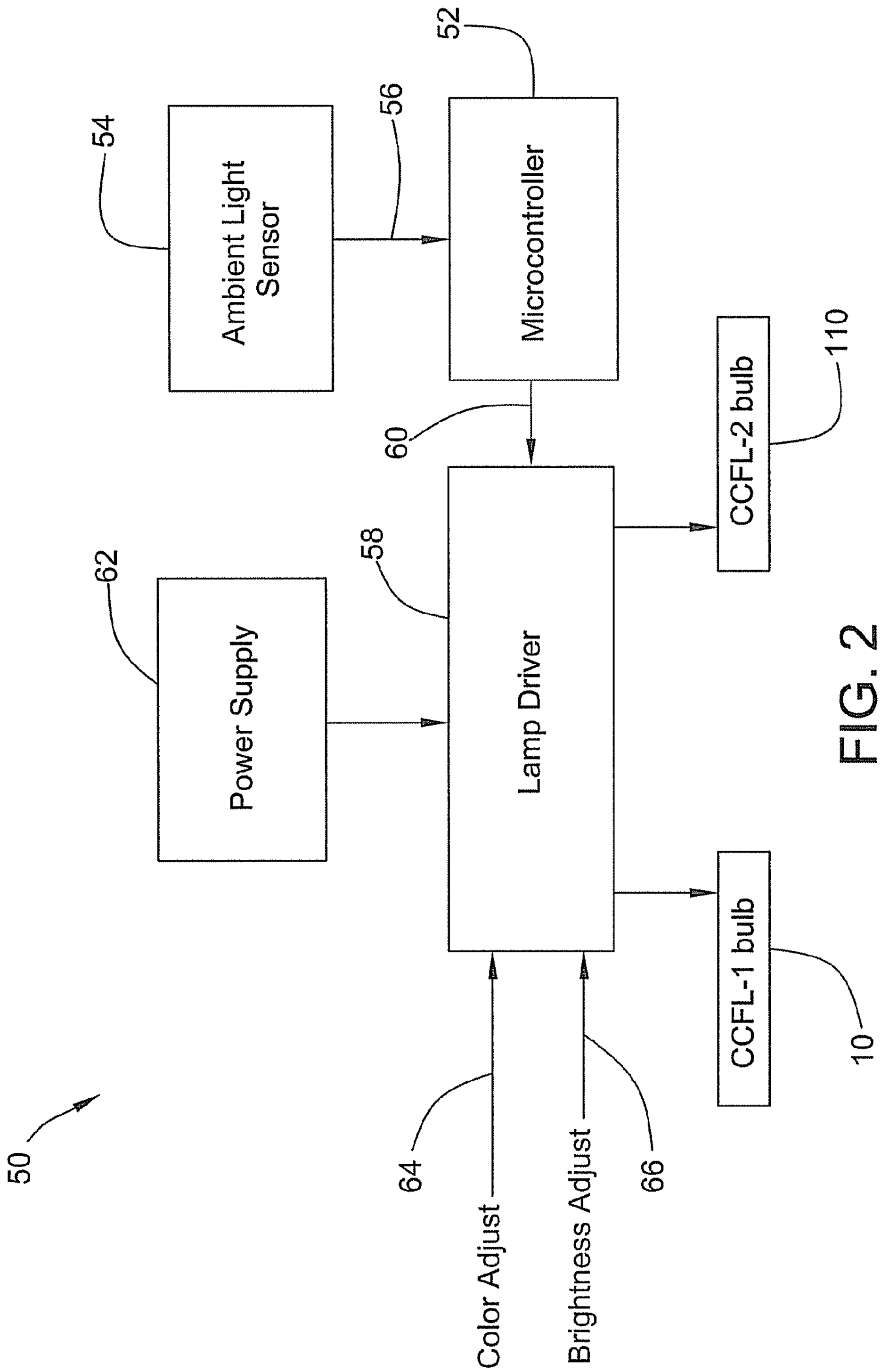
FIG. 2 is a block diagram of a control circuit that may be used in conjunction with the arrangement shown in FIG. 1.

FIG. 2 is a block diagram representation for a control circuit 50 that may be used to power the tube assembly 10 (or multiple tube assemblies) such as shown in FIG. 1. The control circuit includes a microprocessor 52 that receives an ambient light sensing signal from an ambient light sensor 54 via a line 56. The microprocessor 52 operates in a logical fashion to provide an output signal to lamp driver circuitry 58 via a line 60. The lamp driver circuitry 58 also receives power from a power supply 62. The lamp driver circuitry 58 is further disposed to receive other signals, such as a color adjust signal on a line 64 and a brightness adjust signal on a line 66. In response to these signals, including the control signal supplied on line 60, the lamp driver circuitry 58 provides a controlled output voltage and current to the electrodes of a plurality of tube assemblies 10, 110.

Figure 3:
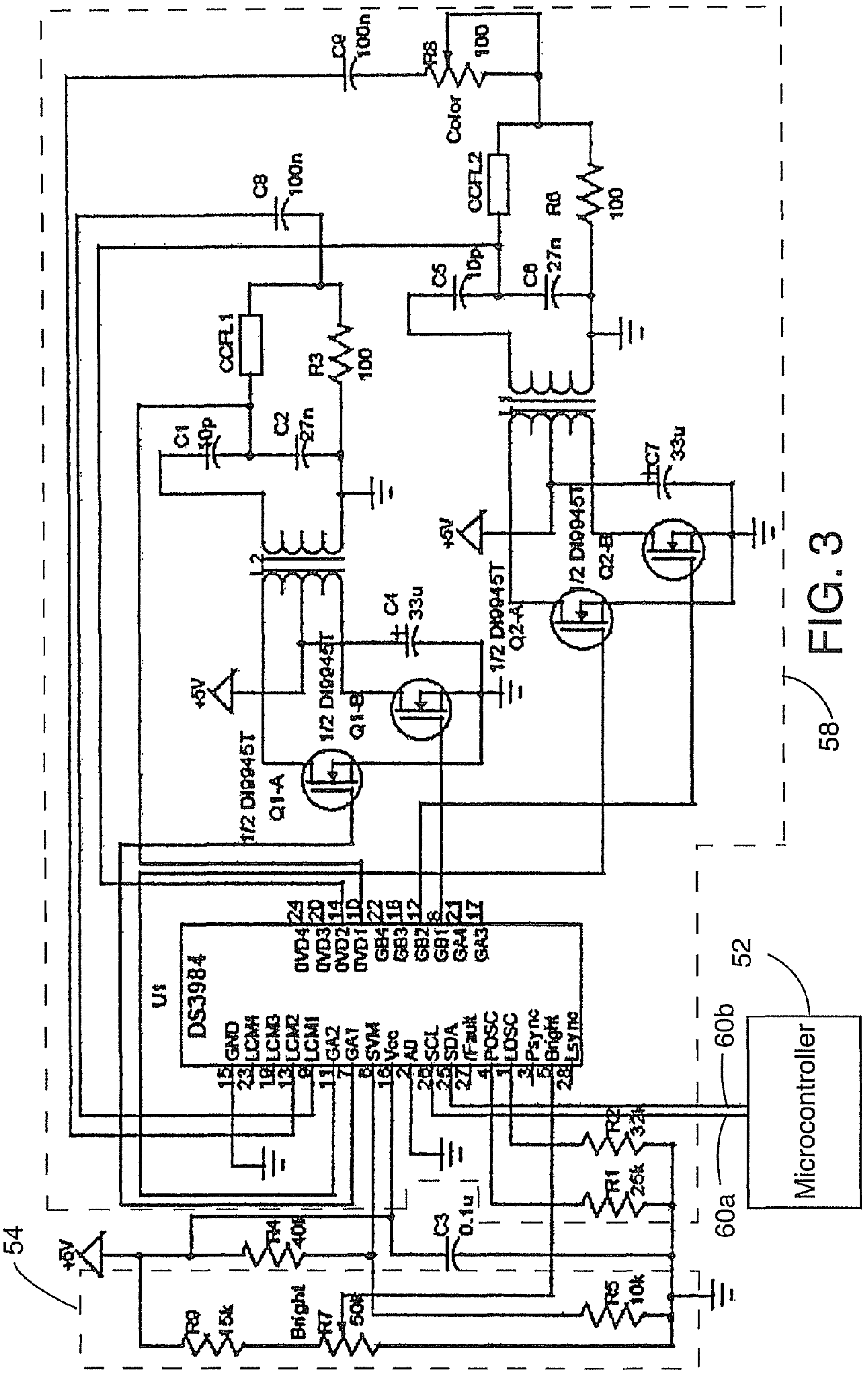
FIG. 3 is a partial electrical schematic of the block diagram representation shown in FIG. 2 according to one embodiment of the disclosure.

FIG. 3 illustrates the control circuitry shown in FIG. 2 in greater detail. In a preferred embodiment, the microprocessor 52 is connected to a microcontroller-based drive circuit, denoted as U1, through a serial interface, denoted by lines 60*a*, 60*b*. In a preferred embodiment, the microcontroller-based drive circuit U1 is implemented as a 4-Channel Cold-Cathode Fluorescent Lamp Controller manufactured by Dallas Semiconductor. In a preferred embodiment, a brightness control circuit 54 illustrated in FIG. 3 varies a pulse width output signal generated by the microcontroller 52, which is passed through the driver circuit U1 and applied to the gate terminal of a plurality of FETs, Q1-Q4.Q2. This output signal controls the run voltage that is applied across the fluorescent lamps CCFL1, CCFL2.

In one preferred embodiment, the brightness may be varied from about 10% to 100%. Additionally, the microcontroller-based drive circuit U1 that connects externally to the microprocessor 52 is operable to control the brightness based upon a signal intensity signal received by the ambient light sensor 54.

The pulse-width varied output signal applied to Q1-Q4 Q2, which varies the brightness of the fluorescent lamps CCFL1, CCFL2. The brightness, however, may also or in addition be varied by means of an algorithm operating within the microprocessor 52, as described in greater detail below.

The power developed and used for striking and operating lamps CCFL, CCFL2, is controlled by the microcontroller-based drive circuit U1. The microcontroller-based drive circuit U1 is chosen to automatically supply a desirable start (or pre-heat) and operating power for the CCFL bulbs chosen. The components utilized in conjunction with one preferred implementation of the disclosure are provided in Table II below. By adjusting the component values in Table II, the design may be modified to function correctly with various diameter and length CCFL bulbs. Typical CCFL striking voltages vary from 400 to 1000 volts, with run voltages nearly one-half to one-fourth of their respective initial striking values. The values and ratings for various components used in a preferred embodiment of a control circuit as shown in FIG. 3 are set forth in the following Table II.

TABLE II

Bill of Materials for CCFL Fluorescent Bulb Replacement For FIG. 3

| Component | Description | Value |
|---|---|---|
| U1 | IC CCFL Driver | DS3984 |
| CCFL1 | CCFL Tube | 2 mm × 24 |
| CCFL2 | CCFL Tube | 2 mm × 24 |
| R1 | Resistor | 25K |
| R2 | Resistor | 32K |
| R3 | Resistor | 100 |
| R4 | Resistor | 40K |
| R5 | Resistor | 10K |
| R6 | Resistor | 100 |
| R7 | Resistor | 50K |
| R8 | Resistor | 100 |
| R9 | Resistor | 15K |
| R0 | Resistor | 100 |
| C1 | Capacitor | 10p |
| C2 | Capacitor | 27n |
| C3 | Capacitor | 0.1u |
| C4 | Capacitor | 33u |
| C5 | Capacitor | 10p |
| C6 | Capacitor | 27n |
| C7 | Capacitor | 33u |
| C8 | Capacitor | 100n |
| C9 | Capacitor | 100n |
| Q1-Q2 | N Channel Dual Mosfet | D19945T |
| L1-L2 | Transformer | 1:120 primary CT |

The color adjustment provided by resistors R8 (and R11 in another embodiment below) vary the balance between pairs of CCFL bulbs. Since each bulb in a pair (such as CCFL-1 and CCFL-2 in FIGS. 2 and 3) is a different color, the color of the resulting light emitted by the composite lamp may be varied anywhere from 10% color1+100% color2 to 100% color1+10% color2 (i.e., from 10% colorCCFL-1+100% colorCCFL-2 to 100% colorCCFL-1+10% colorCCFL-2). For example, if color1 is white and color2 is yellow, a soft white hue may be obtained in the middle of the color adjustment range. The color adjustment in this case is achieved by varying the duty cycle of pulse-width modulated output signals applied to the lamps CCFL-1 and CCFL-2 shown in FIGS. 2 and 3. Various colors may be used to benefit mood, ambiance, productivity, and even psychological health in an environment, as described above.

Figure 3A:
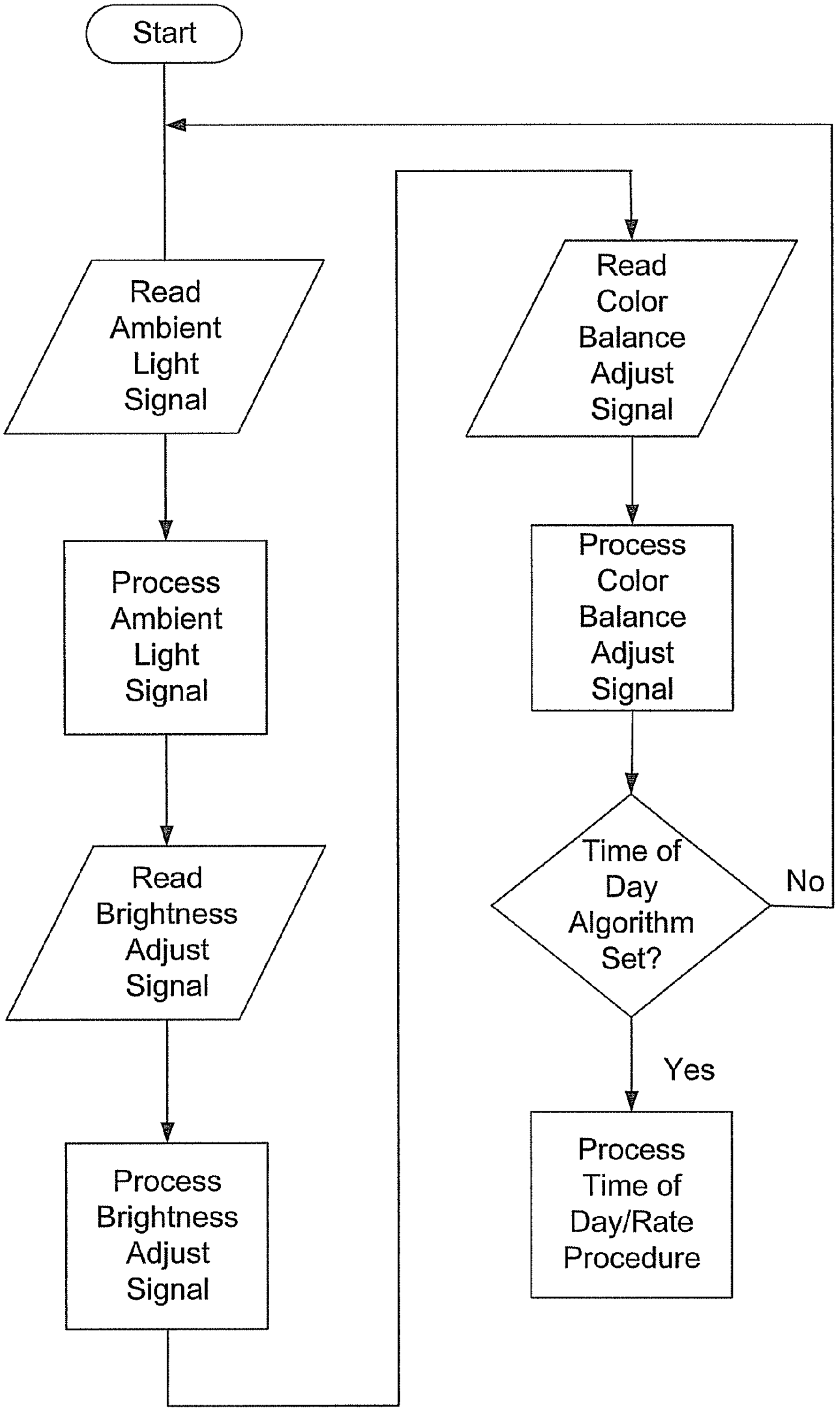
FIG. 3A is a flowchart illustrating a procedure that may be used in conjunction with the circuitry shown in FIGS. 2 and 3 for providing an output color selection signal.

FIG. 3A illustrates a procedure that may be performed by the microprocessor 52 for the lighting system according to the illustrated embodiment. The system begins and proceeds to a "Read Ambient Light Signal" block in which the signal developed by the ambient light sensor 54 shown in FIGS. 2 and 3 is read by the processor 52. In a preferred embodiment, the ambient light signal is read in synchronization with "anti-burst" portion of the output cycle of the lamp, as explained below. In this way, the ambient light is detected when the least contribution thereto is provided by the lamps CCFL-1 and CCFL-2. The processor 52 operates in a logical fashion to adjust the output color selection signal supplied to the lamp driver circuit 58, which in turn, causes the output pulse-width modulated signals applied to the lamps to be altered. Specifically, to increase the intensity of the lamp assembly, the intensities of the individual lamps CCFL-1 and CCFL-2 the duty cycle of their pulse-width driving signals changed proportionally as the frequency of these driving signals is substantially constant in a preferred embodiment. Thus, when the detected ambient light exceeds an ambient light limit (preferably a lumens high threshold), then the output color selection signal provided to the lamp driver circuit 58 causes the pulse-width output signals to both lamps CCFL-1 and CCFL-2 to be decreased in proportion to each other. On the other hand, when the detected ambient light is less than the threshold, the output signal provided to the lamp driver circuit 58 causes the duty cycle of pulse width signals applied to the lamps CCFL-1 and CCFL-2 to be increased in proportion to each other as shown at a "Process Ambient Light Signal" block in FIG. 3A.

Next, the system proceeds to a "Read Brightness Adjust Signal" block and obtains data corresponding to the brightness adjust signal supplied from the lamp driver circuit 58. The system then proceeds to a "Process Brightness Adjust Signal" and causes the pulse width output signals applied to the lamps CCFL-1 and CCFL-2 to match the desired output intensity level. The system next obtains a color balance adjust signal at a "Read Color Balance Adjust Signal" block and processes this signal at a next block. In this instance, the color balance adjust signal is also obtained from the lamp driver circuit 58. For adjusting the color output of the lamps, the respective intensities of the lamps CCFL-1 and CCFL-2 are varied such that they are reset to a different proportion with respect to each other. The resulting output of the lamp assembly, however, has the same brightness or intensity when the summation of the intensities is the same as prior to the color adjustment.

Next, a preferred implementation of the system proceeds to a "Time of Day Algorithm Set" decision block. If the system is not equipped with such functionality or if it is disabled, the system returns to the beginning and repeats. On the other hand, if the system has the capability to apply color variation signal based on time-of-day, the system then branches to such procedures.

Figure 3B:
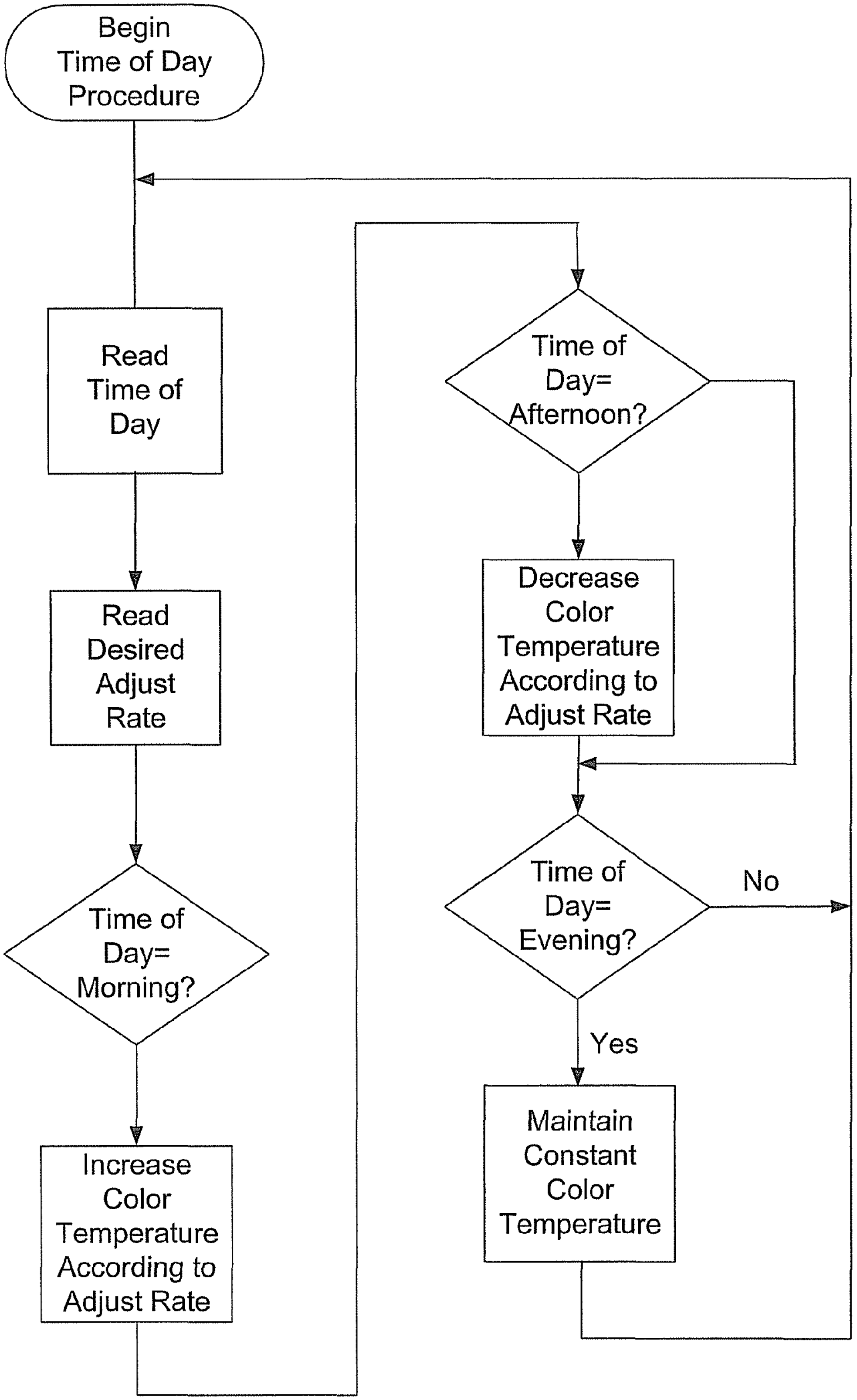
FIG. 3B illustrates a further procedure that optionally may be performed by the disclosed circuitry.

FIG. 3B illustrates an exemplary algorithm that may be performed to automatically adjust the color and/or intensity output of the fixture. At this point, the system sets the pulse width output of a first color lamp (CCFL-1 in FIGS. 2 and 3) and a second color lamp (CCFL-2 in FIGS. 2 and 3) according to the time of day algorithm. As shown, the processor 52 begins by reading the Time of Day in a first stage and then proceeds to a next stage in which a Desired Adjust Rate, namely the desired rate at which the hue or color temperature is to be automatically adjusted by the system, is also read by the processor 52. In a preferred embodiment, the Desired Adjust Rate may be either linear or a "reverse logarithmic rate" in which the hue changes at an increased rate at the beginning of a time period and at a reduced rate at the ending of the period. In the illustrated embodiment, the processor 52 determines whether the Time of Day is the morning in a next decision stage. If so, the processor 52 operates to cause the color temperature to be increased according to the Desired Adjust Rate at a next processing stage. That is, the color temperature or hue of the combined output of the color lamps gradually increases during the morning hours, such as between 7:00 am and 12:00 pm. Such increase may occur either as a linear function or at a reverse logarithmic rate such that the rate of change increases later in the morning.

On the other hand, if the processor 52 determines that the time of day is "Afternoon," the processor 52 operates to cause the color temperature to decrease according to the Desired Adjust Rate, as shown at a "Decrease Color Temp. According To Adjust Rate" stage. During the afternoon, the hue or color temperature gradually decreases, either in a linear fashion or at a reverse logarithmic rate. The color temperature preferably remains constant during evening hours, such as between 5:00 pm and 7:00 pm., as shown by the "Maintain Constant Color Temp." stage in FIG. 3B.

Optionally, the embodiment shown in FIGS. 2 and 3 may also include logic enabling the receipt of remote command signals. Such signals may be received from remote sources via a local area network or a wide area network. In this way, the control arrangement may receive external control signals via a home network or via the Internet. Such control signals are received by the processor 52 and processed in order to vary the output color selection signal. Specifically, the processor adjusts the pulse-width output signal provided to the lamps CCFL-1 and CCFL-2 such that the summation of the color pulse-width of CCFL-1 and the color pulse-width of CCFL-2 are altered to be the same as the Adjusted pulse-width signal corresponding to the received remote command signal.

Advantageously, the fluorescent replacement bulb assembly includes adjustment for both brightness and color. This enables the assembly to last up to five times longer provide greater efficiency than conventional fluorescent bulbs because energy use can be limited by automatically or manually dimming the lamp. The recent need for global energy savings, and the fact that lighting consumes 30% of the world's energy males this a very desirable ecological product.

The brightness and/or color may be both automatically controlled based upon ambient light needs. Specifically, when the ambient light gets darker, more light is emitted by the tube assembly. On the other hand, when ambient light gets brighter, less light is emitted. The color may also be varied according to an algorithm that operates as explained above. In a preferred embodiment, the sensor 54 is a broad spectrum visible light sensor that measures the ambient light. This sensor is also the currently preferred sensor illustrated as sensor 154 in FIG. 5 and sensor 254 in FIG. 7 below. The ambient light is preferably measured during short "anti-bursts" of generated light that occur periodically as a result of sinusoidal nature of run power supplied to each lamp. In a preferred embodiment, the light generated by the lamp assembly is reduced to 10% of maximum during this relatively short burst of time. This so-called "anti-burst" frequency and the length of the burst itself are adjustable according to an algorithm that determines an optimum detection versus potential undesirable flicker. In a preferred embodiment, a five second period is used as the "anti-burst" interval and 330 microseconds is used for the length of an "anti-burst."

The detected ambient light is averaged from several "anti-burst" cycles, at which time the phosphor has dimmed to 10% of its full brightness potential. In this way, the ambient is measured during the zero crossings of the sine wave, for several successive cycles, near the end of the "anti-burst." In the illustrated embodiment, light measurement for three consecutive zero crossings are averaged at 15 micro-second intervals. The ambient sensor 54 is also oriented away from the lamp so that it senses light from the ambient as much as possible. This avoids effects of residual light glowing in the phosphors of the local lamp.

Color variations, such as for example, from white to soft or yellow-white vary according to the time of day. The softer white is actually a mixture of green and blue light which occurs outside mostly during the morning and evening hours. The algorithm is thus basically a variation in color and brightness with respect to time, by varying the intensity of the light pairs as described above. Any variation may be accomplished, but the current embodiment varies the light gradually from 10% color1+100% color2 to 100% color1+10% color2 over a desired time interval, such as in a 12 hour period or according to the Time of Day procedure described above. The softer light containing more blue-green is applied in the earlier and later hours of each day. The whiter light is applied during noon and midnight times of the day. The addition of a FET in series with R8 (and one in series with R11 in the other embodiment) gated by the output of a DAC which is connected to the microcontroller is required to add this functionality. Additionally, the maximum brightness level can be set limited manually with a screw driver (from 10% to 100% with the screw driver adjustment).

The color adjustment feature provides increased versatility as multiple bulbs of different colors are not required for different applications. Additionally, a warm color light may readily be provided to an interior space, such as inside a building. The disclosed arrangement also provides extended wear inasmuch as it preferably employs CCFL technology instead of standard fluorescent technology. The driver is more sophisticated to power several CCFL bulbs as compared with standard fluorescent bulbs, but no internal filament is used that can burn out, thus the life span is increased. Other ballast changes or other modification is not required for this fluorescent replacement bulb to function. It may be inserted into an existing fixture and used.

In an alternative embodiment, the lamp assembly is equipped with remote control features to adjust brightness and/or color of all the lamps within a room, but the only allowable variance will be within the limits set by the screwdriver settings. This embodiment also requires an appropriate ballast change to the existing fluorescent fixture. Other embodiments will adjust light intensity and/or color automatically based upon time of day in combination with ambient light. Specifically, this assembly may work as described above.

Another aspect of the disclosure addresses the drawbacks for current drop ceiling fluorescent lighting systems. The current systems are large and heavy requiring large effort in installation and inspections. On the other hand, the present disclosure further provides a relatively lightweight solution that drops into the drop ceiling just as a ceiling tile. This is accomplished by using standard Cold Cathode Fluorescent tubes. This technology is as energy efficient as T8 fluorescent technology, but can be set for even higher efficiency with built-in dimming, which is not easily possible with current fluorescent systems. There is also a slight gain in efficiency due to the use of small diameter CCFL tubes, when compared with typical hot filament T8 or T12 larger diameter fluorescent bulbs. The highest efficiency fluorescent tube has a diameter in the 1-2 mm range. Additionally, concerns with respect to the human health effects from exposure to current fluorescent lamps due to the spectrum and color of the light (in that bright white light is very artificial) are avoided in this disclosed arrangement. The disclosure according to another aspect resolves that problem with a built-in color correction adjustment.

Figure 4:
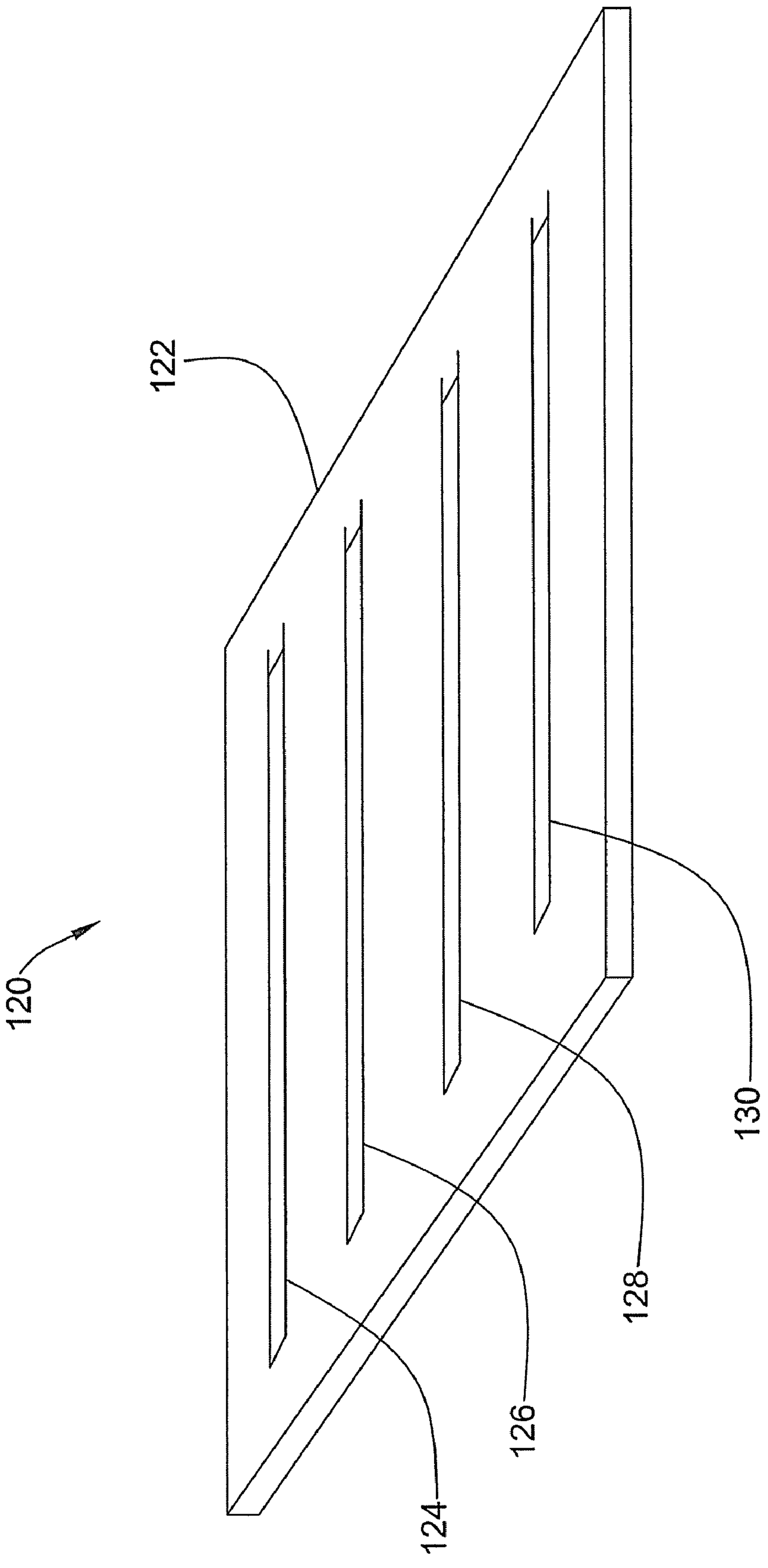
FIG. 4 is a diagram of a CCFL lighting fixture according to another aspect of the disclosure.

FIG. 4 is an isometric view of another embodiment of the disclosure. In this embodiment, an integrated ceiling tile assembly 120 is adapted to be fit within a conventional ceiling tile system. The tile assembly 120 has a generally rectangular configuration that includes a housing portion 122 and a plurality of CCFL tube assemblies 124-130, which may be generally of the construction shown in FIG. 1 in certain respects.

This embodiment provides a lighting system that consists of a standard drop ceiling tile lamp. This lamp does not require big bulky fixture with a ballast as in current drop ceiling systems. In one exemplary embodiment, the tile assembly is the size of a 2'×2' ceiling tile, and no larger. The lamp bulbs 124-130 may last up to five times as long as standard fluorescent bulbs. Also, this embodiment does not require a licensed contractor or other skilled personnel for installation because the voltages used to power the lamps are low enough to be safe for layman installation. A ceiling tile is removed and simply replaced with the light weight lamp tile. One wire must be attached to the low voltage distribution system mounted above the drop ceiling. A licensed electrician is required to mount the low voltage supply only.

This feature addresses the problem conductor length used to drive the CCFL tubes within the lamp, and the difficulty related to attaching the conductor to the driving power. That is, the invention uses a low impedance flat conductor having a point-of-need drivers and a low impedance quick connect connector for the CCFL tubes. With this system, the entire drop ceiling lamp assembly can be controlled by one main driver, distributed to a sub-driver circuit located near each CCFL tube. The quick connect connectors allow each tube to be easily replaced and held in place by gravity and tension. CCFL technology offers longer life, about 3 times that of standard fluorescent tubes, because there is no filament to burn-out. As a result, CCFL technology also offers better resistance to the environmental effects of vibration, since filaments tend to break under vibration stresses.

Figure 4A:
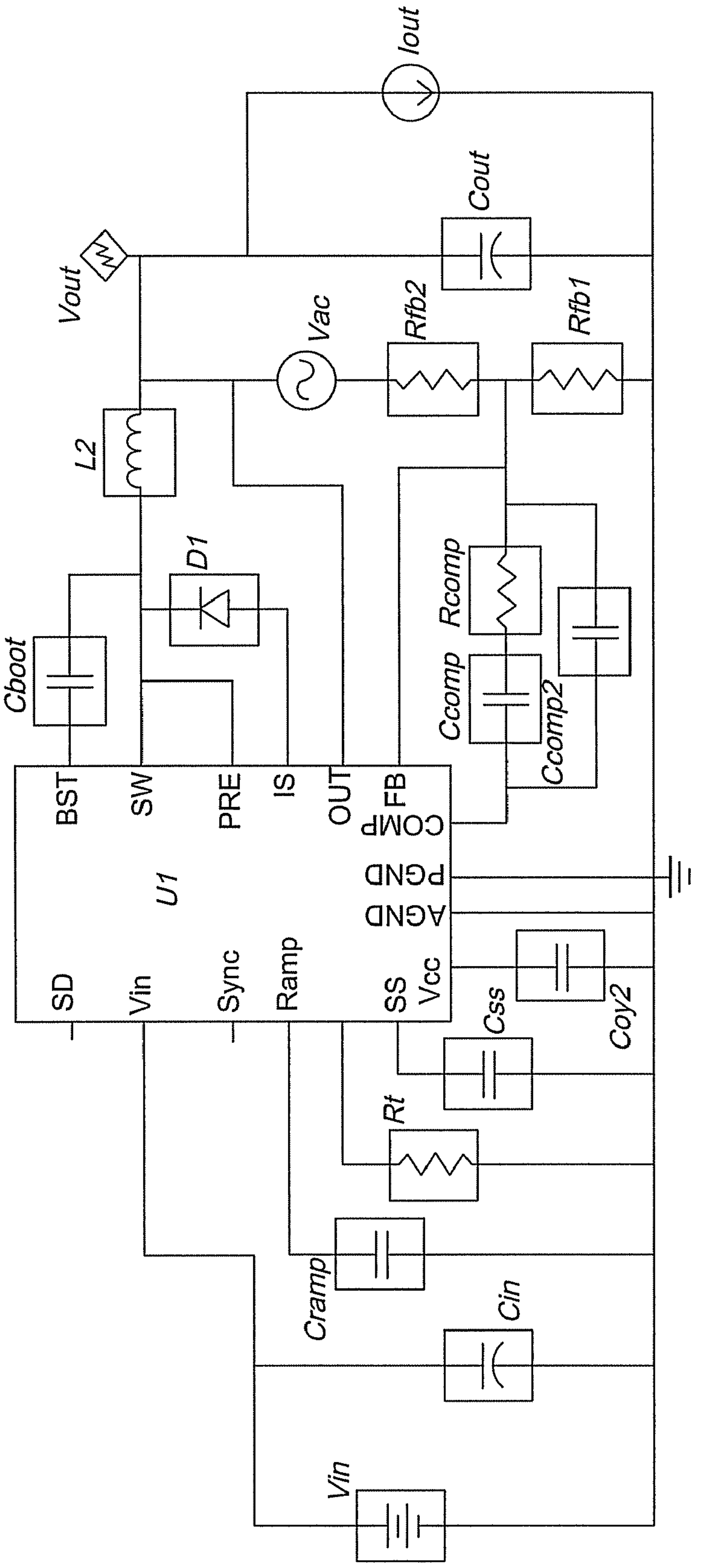
FIG. 4A is a switching power supply circuit that may be used in conjunction with the disclosure.

FIG. 4A is an electrical schematic diagram that depicts a circuit used to generate a 5-volt DC output signal to supply the various CCFL driver circuits that may be used with the present disclosure. The circuit is a 5 Volt switching power supply that may be designed by using any of a number of sources, such as an on-line tool provided by National Semiconductor, WebBench™. A signal Vin is a source voltage depending upon the type of fixture (Fluorescent Bulb Replacement, Ceiling Tile, or LED described below) being utilized. An integrated circuit U1 is a switcher IC for a buck converter. In this embodiment, a 5 Volt output signal is provided at a line Vout. A pair of capacitors Cin and Cout are used as filter capacitors that smooth the input and output voltage signals. A resistive-capacitive network implemented with capacitors Cramp, Ccomp, and resistors Rt, and Rcomp are used to soft start the switcher and provide correct phase response. Resistors Rfb are used to finely adjust the voltage to 5 volts. A diode D1 and inductor L1 are used to rectify and filter the high frequency pulses generated by the switch in the controller U1. The input voltage signal Vin is 34 volts which is full-wave rectified from the main 24 volt AC bus wiring used in the preferred embodiments of the disclosure (except the Fluorescent Bulb Replacement version). The 24 volt AC input allows for non-licensed electricians to install the ceiling tiles. The Fluorescent bulb replacement version may also be installed in a similar fashion to as how one would replace a T12 or T8 fluorescent bulb.

Table III below sets forth the type and rating for the components according to a preferred implementation of the circuit shown in FIG. 4A

TABLE III

| Item | Manufacturer | Description | Ref. Designator | Value Title | |
|---|---|---|---|---|---|
| 1 | Yegeo America | Capacitor | Cramp | Capacitance | 330 pf |
| | | | | Voltage-Rated | 50 V |
| | | | | Tolerance | +/−10% |
| 2 | AVX | Capacitor | Cbyp | Capacitance | 1 uF |
| | | | | Voltage-Rated | 25 V |
| | | | | Tolerance | +/−10% |
| 3 | AVX | Capacitor | Cboot | Capacitance | 0.022 uf |
| | | | | Voltage-Rated | 50 V |
| | | | | Tolerance | +/−10% |
| 4 | AVX | Capacitor | Css | Capacitance | 8200 pf |
| | | | | Voltage-Rated | 50 V |
| | | | | Tolerance | +/−10% |
| 5 | Diodes Inc | Diode | D1 | Voltage-Rated | 90 V |
| | | | | Current Rating | 3 A |
| 6 | Kemet | Capacitor | Ccomp2 | Capacitance | 750 pf |
| | | | | Voltage-Rated | 50 V |
| | | | | Tolerance | +/−10% |
| 7 | Coiltronics | Inductor | L1 | Mounting | SMD |
| | | | | Inductance and Current | 33 UH 7.7 A |
| 8 | Panasonic | Resistor | Rfb1 | Resistance In Ohms | 1k |
| | | | | Power | 1/10 W |
| | | | | Tolerance | 1.00% |
| 9 | Panasonic | Resistor | Rt | Resistance In Ohms | 21k |
| | | | | Power | 1/10 W |
| | | | | Tolerance | 1.00% |
| 10 | Panasonic | Resistor | Rfb2 | Resistance In Ohms | 3.09k |
| | | | | Power | 1/10 W |
| | | | | Tolerance | 1.00% |
| 11 | Panasonic | Resistor | Rcomp | Resistance In Ohms | 9.31k |
| | | | | Power | 1/10 W |
| | | | | Tolerance | 1.00% |
| 12 | Murata | Capacitor | Cin | Capacitance | 68000 pF |
| | | | | Voltage-Rated | 100 V |
| | | | | Tolerance | 10.00% |
| 13 | Murata | Capacitor | Ccomp | Capacitance | 4300 pF |
| | | | | Voltage-Rated | 20 V |
| | | | | Tolerance | 5.00% |
| 14 | National | Semi | U1 | 2.5 A INTEGRATED BUCK REG.75 V | LM5005 |
| 15 | Kemet | Capacitor | Cout | Capacitance | 47 uF |
| | | | | Voltage-Rated | 20 V |
| | | | | Tolerance | +/−10% |

Figure 5:
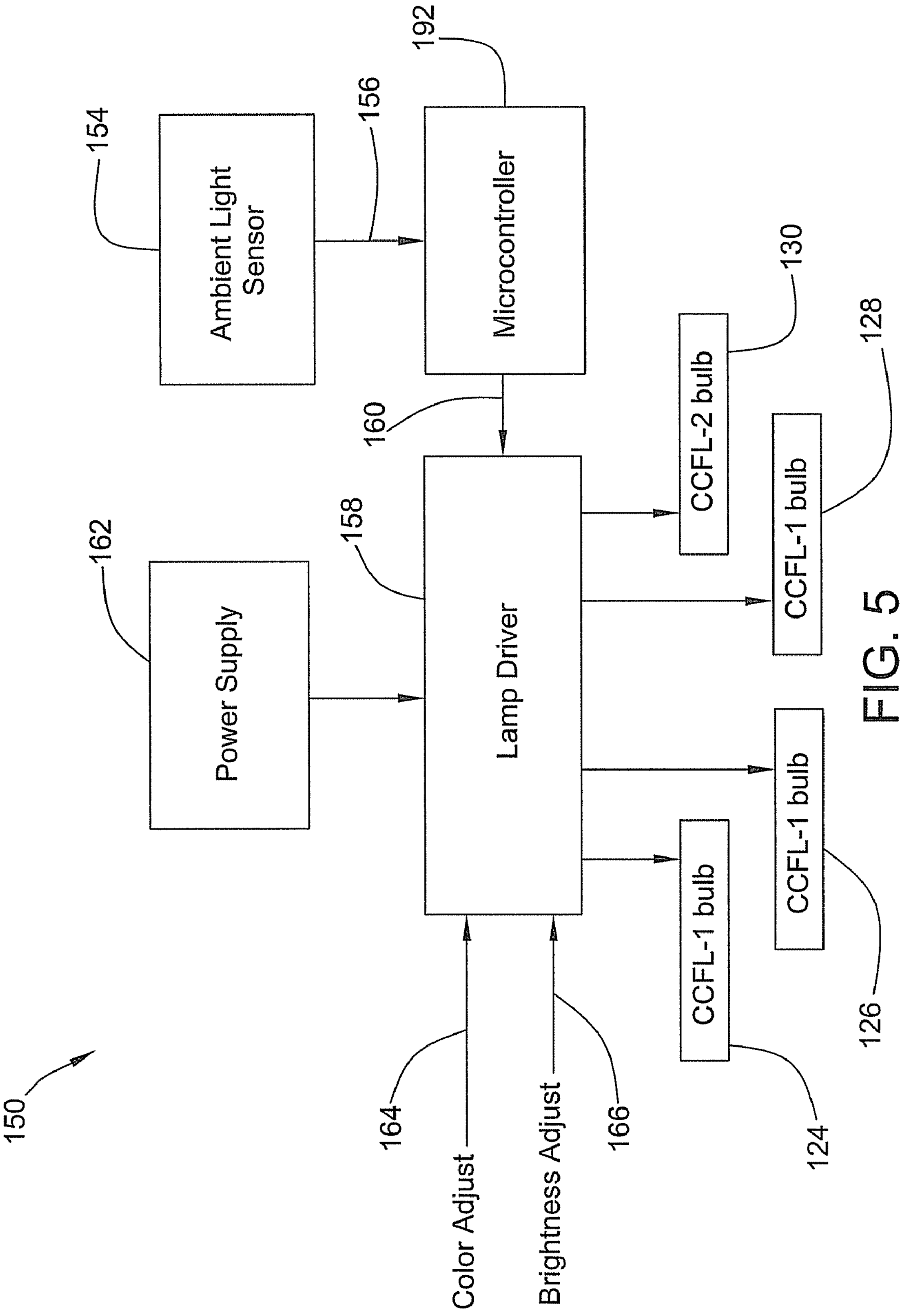
FIG. 5 is a block diagram representation of a control circuit for operating the lighting fixture shown in FIG. 4.

The tile assembly 120 preferably is driven by circuitry, and has many or all of the features for brightness and color manual and automatic adjustments, as the tube assembly 10 described above. Specifically, FIG. 5 illustrates a block diagram representation for a control circuit 150 that may be used to power the plurality of tube assemblies 124-130. As with the control circuit shown in FIGS. 2 and 3, the control circuit 150 includes a microcontroller 192 that receives an ambient light sensing signal from an ambient light sensor 154 via a line 156. The microcontroller 192 operates in a logical fashion to provide an output signal to lamp driver circuitry 158 via a line 160, essentially in a manner similar to that described above in connection with FIGS. 3A and 3B. The lamp driver circuitry 158 also receives power from a power supply 162, the details of which are described above in connection with FIG. 4A. As with the control circuit 50, the lamp driver circuitry 158 is further disposed to receive other signals, such as a color adjust signal on a line 164 and a brightness adjust signal on a line 166.

In response to these signals, including the control signal supplied on line 160, the lamp driver circuitry 158 provides a controlled output voltage and current to the electrodes of a plurality of tube assemblies 124-130.

Figure 6:
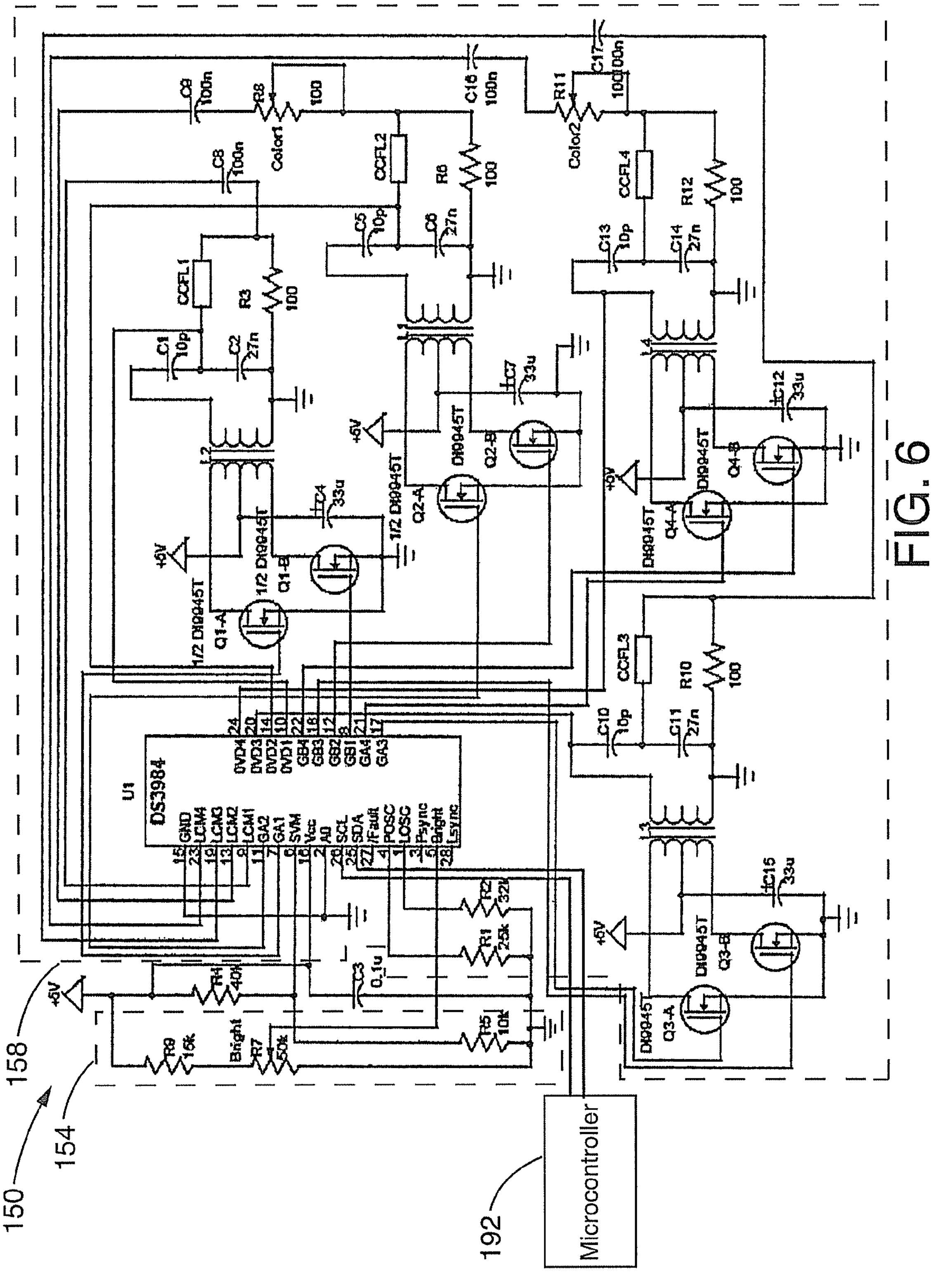
FIG. 6 is a partial electrical schematic diagram of the block diagram representation shown in FIG. 5.

FIG. 6 illustrates the control circuitry 150 in greater detail. That is, the control circuitry includes a microcontroller 192 that is connected to lamp driver circuitry 158, which includes a microcontroller-based drive circuit U1, as well as ambient light sensor circuitry 154. The differences between the circuit used in conjunction with the embodiments of FIG. 3 and FIG. 6, namely, the fluorescent bulb replacement version versus the drop-ceiling tile version, are minimal in one implementation of the disclosure. For example, the embodiment shown in FIG. 3 uses a different number and size of bulbs, and the associated values for components in Table 1, which vary depending upon bulb type used in the design, are likewise different. Another difference is in the physical placement of the electronics. In the bulb replacement version, the electronics are miniaturized as much as possible and mounted at one or the other end of the bulb. In the drop ceiling version, the electronics may be mounted anywhere above the foil reflective material.

The values and ratings for various components used in a preferred embodiment of the circuit illustrated in FIG. 6 are set forth in the following Table IV below:

TABLE IV

| Component | Description | Value |
|---|---|---|
| U1 | IC CCFL Driver | DS3984 |
| CCFL1 | CCFL Tube | 2 mm × 24 |
| CCFL2 | CCFL Tube | 2 mm × 24 |
| CCFL3 | CCFL Tube | 2 mm × 24 |
| CCFL4 | CCFL Tube | 2 mm × 24 |
| R1 | Resistor | 25K |
| R2 | Resistor | 32K |
| R3 | Resistor | 100 |
| R4 | Resistor | 40K |
| R5 | Resistor | 10K |
| R6 | Resistor | 100 |
| R7 | Resistor | 50K |
| R8 | Resistor | 100 |
| R9 | Resistor | 15K |
| R10 | Resistor | 100 |
| R11 | Resistor | 100 |
| R12 | Resistor | 100 |
| C1 | Capacitor | 10p |
| C2 | Capacitor | 27n |
| C3 | Capacitor | 0.1u |
| C4 | Capacitor | 33u |
| C5 | Capacitor | 10p |
| C6 | Capacitor | 27n |
| C7 | Capacitor | 33u |
| C8 | Capacitor | 100n |
| C9 | Capacitor | 100n |
| C10 | Capacitor | 10p |
| C11 | Capacitor | 27n |
| C12 | Capacitor | 33u |
| C13 | Capacitor | 10p |
| C14 | Capacitor | 27n |
| C15 | Capacitor | 33u |
| C16 | Capacitor | 100n |
| C17 | Capacitor | 100n |
| Q1-Q4 | N Channel Dual Mosfet | D19945T |
| L1-L4 | Transformer | 1:120 primary CT |

Figure 7:
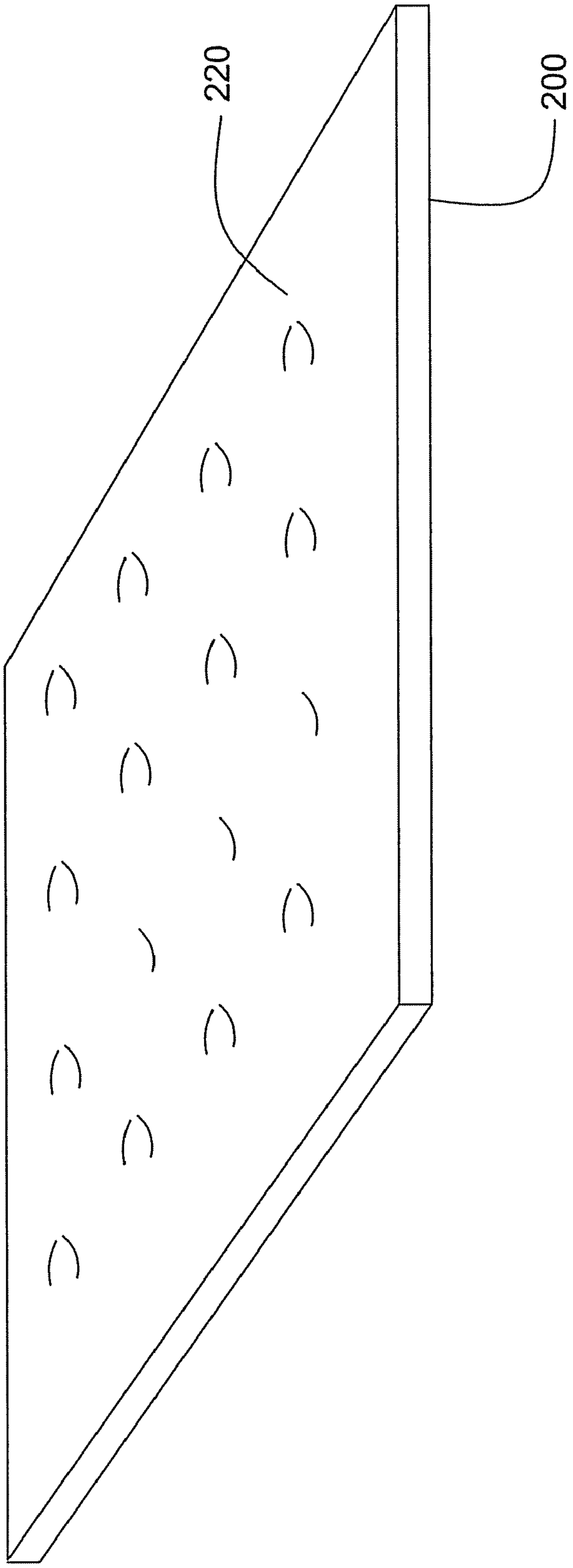
FIG. 7 illustrates an LED lighting fixture according to another embodiment of the disclosure.
Figure 7A:
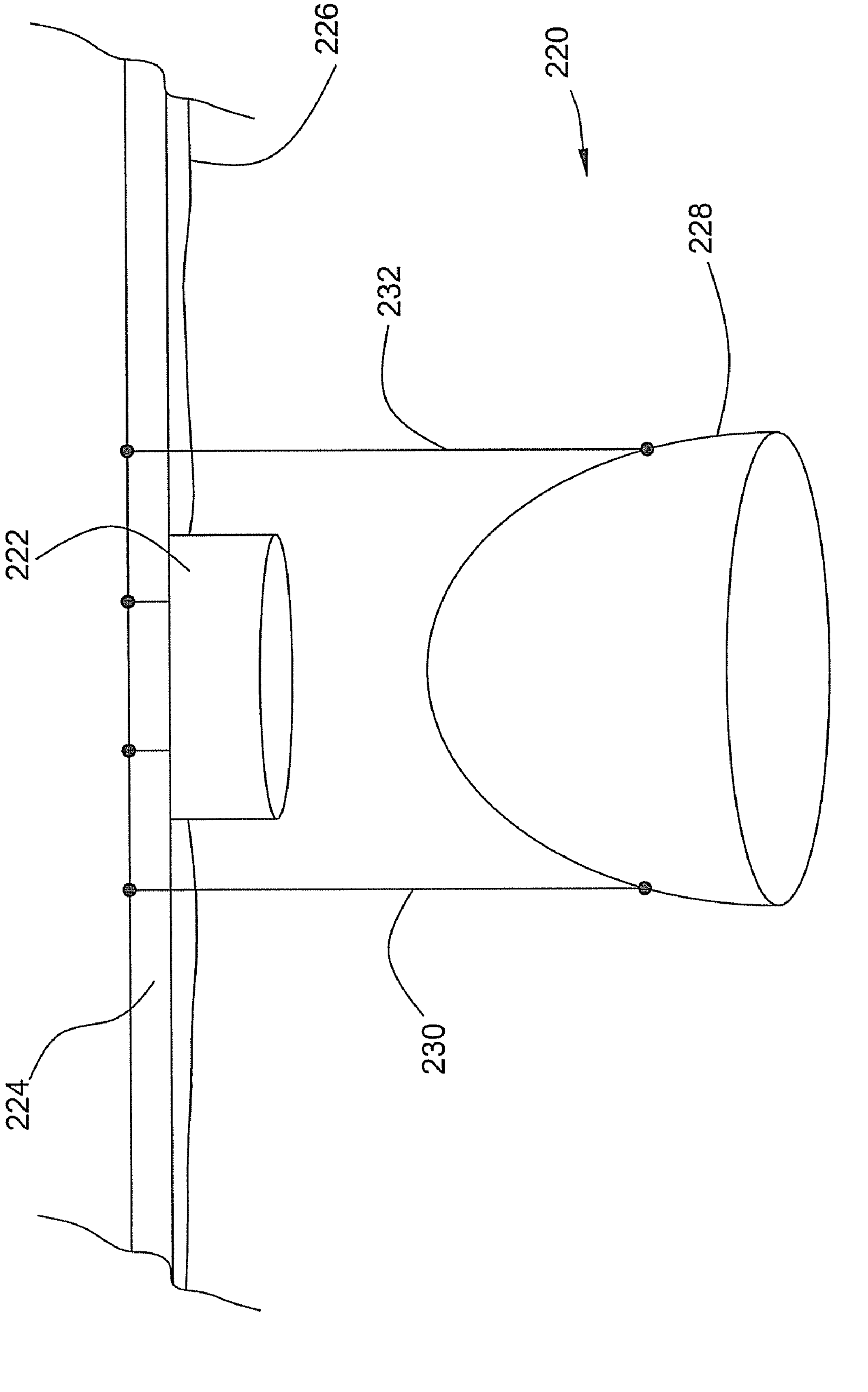
FIG. 7A illustrates one of a plurality of LED lighting assemblies that may be used in conjunction with the fixture shown in FIG. 7.
Figure 8:
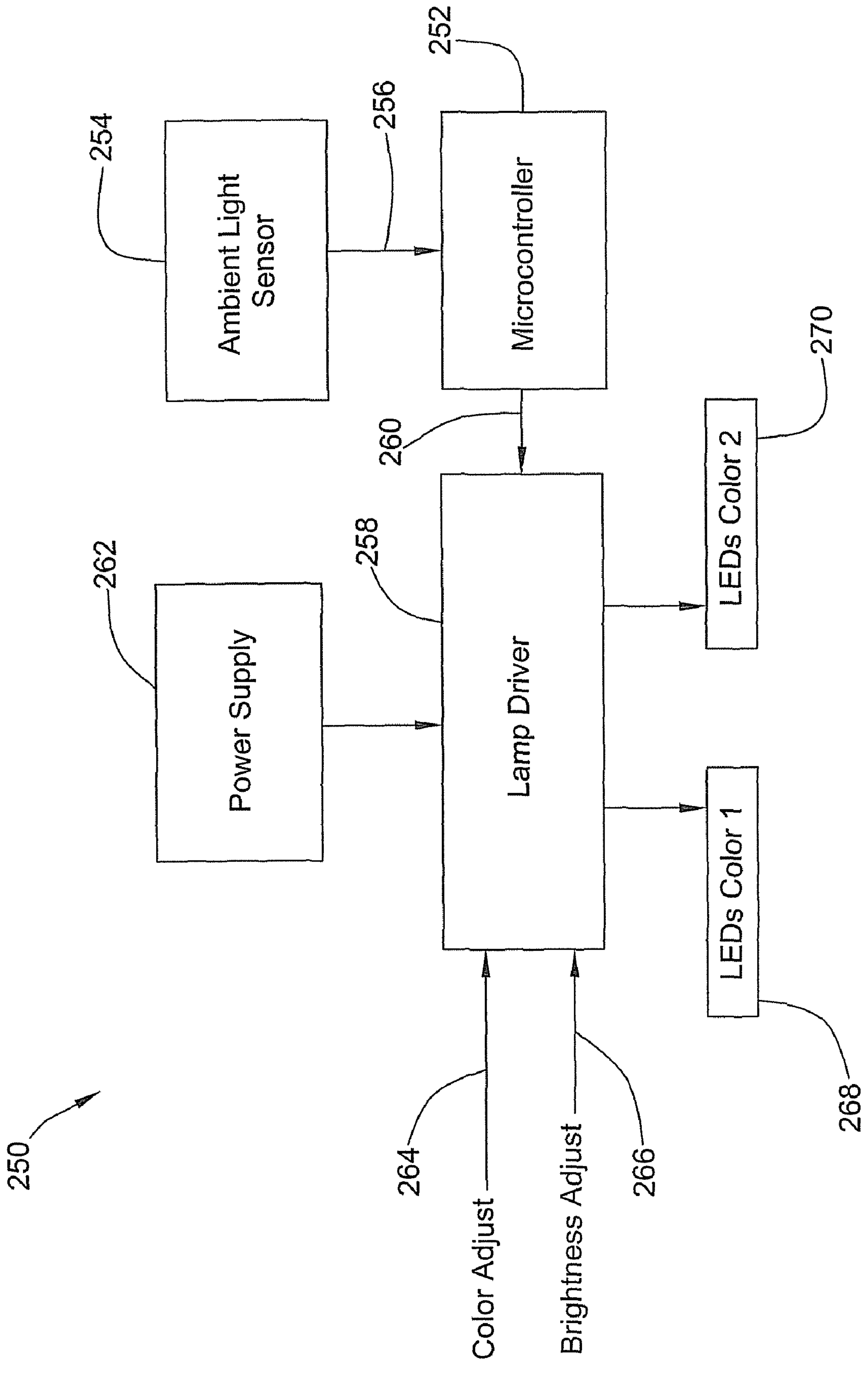
FIG. 8 is a block diagram representation of an LED control circuit that may be utilized in the embodiment shown in FIGS. 7 and 7A.

FIGS. 7 and 8 illustrate a further embodiment of the disclosure according to another aspect. In this embodiment, a plurality of high intensity white or multi-color light emitting diode (LED) assemblies (such as the assembly 220 shown in FIG. 7A) are attached to a ceiling tile 200. Preferably, the white or multi-color LED assemblies 220 are arranged in a grid pattern. As shown in FIG. 7A, the LED assembly 220 comprises an LED housing 222, mounted within a printed circuit board 224. In a preferred embodiment, a reflective foil sheeting material 226 is attached to one side of the printed circuit board 224. For dispersing the light emitted by the color LED, a reverse paraboloidic reflector 228 is disposed in proximal relation to the LED housing 222. In the illustrated embodiment, the reflector 228 is secured in spaced relation from the color LED assembly 222 with the use of mounting wires such as lead wires 230 and 232. Those skilled in the art will appreciate that other mounting means may be utilized.

FIG. 8 is a block diagram of a control circuit 250 for the embodiment of the disclosure illustrated in FIGS. 7 and 7A. This embodiment is used to drive high intensity white or multi-color light emitting diode (LED) arrays, that are preferably arranged in a ceiling tile as shown in FIG. 7. The control circuit 250 includes a microcontroller 252 that receives an ambient light sensing signal from an ambient light sensor 254 via a line 256. The microcontroller 252 operates in a logical fashion to provide an output signal to lamp driver circuitry 258 via a line 260. The lamp driver circuitry 258 also receives power from a power supply 262. The LED driver circuitry 258 is further disposed to receive other signals, such as a color adjust signal on a line 264 and a brightness adjust signal on a line 266.

In response to these signals, including the control signal supplied on line 260, the lamp driver circuitry 258 provides a controlled output voltage and current to the electrodes of a plurality of LED arrays 268, 270. Those skilled in the art will appreciate that the microcontroller 252 operates according to the procedures shown in FIGS. 3A and 3B above.

Figure 9:
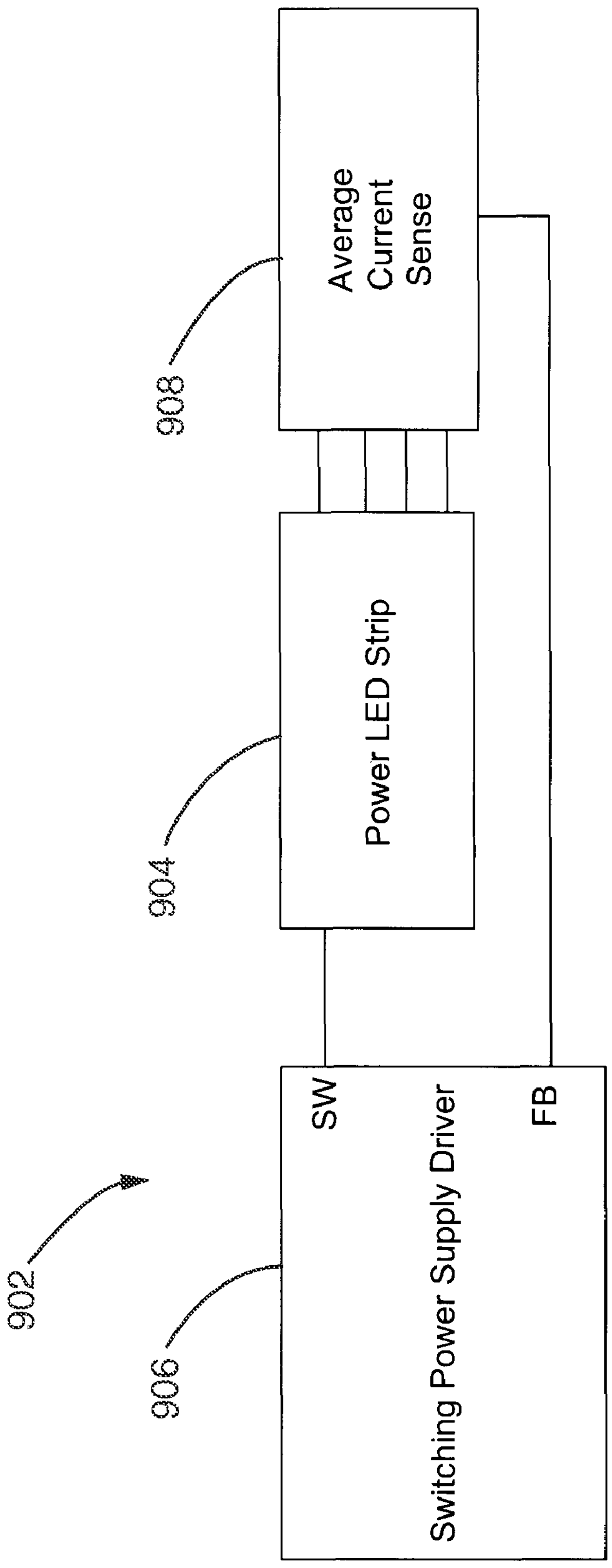
FIG. 9 is a power supplying circuit for the embodiments shown in FIG. 7, FIG. 7A and FIG. 8.

FIG. 9 is a power supplying circuit 902 for the embodiment shown in FIGS. 7-8. The LED ceiling tile version is preferably made of power-supplying strips (denoted as Power LED Strip by a block 904) that are interconnected to a Switching Power Supply Driver Circuit 906 via a main 24 volt bus. The average current is sensed across each LED, via an Average Current Sense Circuit 908 in a conventional manner and fed back to the Switching Power Supply Driver circuit 906. In a preferred embodiment, a 24-volt supply is used to power the ceiling tiles so that a licensed electrician is not required. An entire drop ceiling lighting system can be installed by the ceiling contractor.

Each LED is heatsunk and mounted on the PC board strip, each containing the reverse paraboloidic reflector 228 shown in FIG. 7A. The LEDs in the strip are connected in series to reduce energy losses. To further improve efficiency, a current averaging circuit sends a signal back to the switching power supply driver feedback, ensuring the optimum power to the LED strip. Some LEDs in the strip may be slightly brighter or dimmer than others, but the average brightness for each strip in the tile should be at least substantially the same.

This embodiment provides many advantages with respect to known fluorescent lighting systems. Throughout the world fluorescent fixtures have been used for many years in drop ceilings. These fixtures have been used because of the energy efficiency and the wide distribution of light from a planar source. This embodiment addresses the drawbacks for current drop ceiling fluorescent systems in that current systems are large and heavy. This requires substantial effort in installation and inspection. The disclosed embodiment, which employs a planar array of high-intensity LEDs, is relatively light and drops into the drop ceiling just as a ceiling tile. This technology provides light more efficiently than T8 fluorescent technology, and can be set for even higher efficiency with built-in dimming, which is not easily possible with current fluorescent systems. There is also the ecological advantage in that LEDs do not contain the mercury that potentially contaminates the environment upon breakage of fluorescent lamps. While LEDs may contain amounts of arsenic, but this arsenic can only be released into the environment by finely grinding the solid LEDs into powder, as opposed to the ease of breaking a fluorescent bulb.

Additionally, there are concerns over the human health effects using current fluorescent lamps due to the spectrum and color of the light. The bright white light is very artificial in nature causing stress. The present disclosure resolves that problem with a built-in color correction adjustment. Additionally, utilization of high frequency drivers in LED arrays and the required conductor length necessary to drive the lamps, as well as the difficulty related to attaching the conductor to the driving power are avoided. In the disclosed embodiment, low impedance flat conductors with point-of-need drivers may instead by utilized. The entire drop ceiling lamp assembly can be controlled by one main driver, distributed to a sub-driver circuit located near each strip of LEDs.

The disclosed embodiment also addresses a safety concern with use of high intensity LEDs due to the point source nature of LEDs. The reverse parabolic reflector 228 disposed proximated to each LED effectively distributes the emitted light over a greater surface area via a foil reflector backing. As shown in FIG. 7, one of a plurality of LEDs with paraboloidic reflector 228 to be mounted as an array designed to replace a drop-ceiling tile. This reflector design provides for an easy an inexpensive solution to a drop ceiling tile replacement, as no lens is required below the lights. Additionally, the reflector completely blocks direct light to a viewer, at any angle, preventing potential eye damage from looking directly into high intensity LEDs. While a paraboloidic shape is the currently most preferred mode for practicing this aspect of the invention, other shapes such as a pyramid, cone, or multifaceted geometric shape that approximates a cone or the like would also work. Further, circuit board size (and thus cost) is reduced by making the boards into strips rather than as one solid plane. The strips may be mounted as rows all in one direction forming a planar array of LEDs. The resulting light source is planar in nature.

Therefore, the invention provides an LED ceiling tile assembly with all the features of the CCFL ceiling tile model, described above. Additionally, the ceiling fixture has a unique reflector design that makes the LED lamp easy and inexpensive to assemble. Each LED mounted on the Printed Circuit board preferably includes a reverse parabolic reflector or similar design mounted above it. An array of LEDs will make up the ceiling tile. No additional lens or reflection grid is required. Additionally, this system of reflection serves two purposes. It scatters the light to simulate a planar source and it completely blocks the direct light from each LED, which could potentially damage a human eye because of the great intensity of LEDs as a point source.

Accordingly, a lighting arrangement and control circuitry meeting the aforestated objectives has been described. Those skilled in the art should appreciate that the invention is not intended to be limited to the above described currently preferred embodiments of the invention. Various modifications will be apparent, particularly upon consideration of the teachings provided herein. That is, certain functionality that has been described in conjunction with software components of the system may be combined with other components, or alternatively, be implemented in numerous other ways, whether by other software and/or hardware implementations. Also, although the invention has been described in the context of interactions of various computing systems in a network configuration, those skilled in the art will recognize that many other configurations may be employed. Thus, the invention should be understood to extend to that subject matter as defined in the following claims, and equivalents thereof.

What is claimed is:

1. A system for adjusting the illumination of an interior space, comprising:

a light source including a phosphor coating;

said phosphor coating includes a residual glow;

a lamp driver circuitry deposed to control said light source brightness;

an illumination sensor disposed to detect an illumination of the interior space and provide an illumination signal;

a color balance adjustment input disposed to provide a color balance adjustment signal;

a processor disposed to receive said illumination signal, to receive said color balance adjustment signal, and to provide an output color selection signal;

said processor provides an algorithm for generating a plurality of periodic short anti-bursts of generated light wherein during each anti-burst of generated light, said light source is momentarily, partially, and substantially dimmed for a period short enough to produce no visible flicker and for a period long enough to provide a portion where said residual glow detected by said illumination sensor is minimized;

said anti-burst of generated light includes an end period defined by said portion;

said processor measures said illumination signal only during said end period of anti-burst of generated light;

said processor, in response to said illumination signal adjusts said output color selection signal; and said lamp driver circuitry, responsive to said output color selection signal adjusts said light source brightness.

2. The system of claim 1 wherein the light source is capable of displaying light of a first color and light of a second color and wherein the processor provides an output color selection signal having a first component for increasing the intensity of the light of the first color and a second component for decreasing the light of the second color.

3. The system of claim 2 wherein said lamp drive circuitry provides a pulse-width modulated signal.

4. The system of claim 3 wherein the light source is a fluorescent light source.

5. The system of claim 3 wherein the light source is a Light Emitting Diode source.

6. The system of claim 3 wherein the processor is further disposed to obtain a time of day indication and to adjust the output color selection signal based on the time of day indication.

7. The system of claim 6 wherein the output color selection signal causes an increased color temperature of the light source when the time of day indication corresponds to the morning.

8. The system of claim 7 wherein the output color selection signal causes a decreased color temperature of the light source when the time of day indication corresponds to the afternoon.

9. The system of claim 1 further including means for receiving a remote brightness adjustment signal via an external network connection, wherein the processor is disposed to adjust the output color selection signal to be substantially the same as the remote brightness adjustment signal.

10. The system of claim 1, further including:

a run voltage, defined as a sinusoid with zero crossings, controlled by said lamp drive circuitry, and disposed to drive said light source; and said processor measures said illumination signal in synchronization with plurality of successive zero crossings of said run voltage during said end period of anti-burst of generated light.

* * * * *